(12) United States Patent
Dolle et al.

(10) Patent No.: US 6,191,223 B1
(45) Date of Patent: Feb. 20, 2001

(54) POLYMER BLENDS

(75) Inventors: Volker Dolle, Bensheim; Herbert Terwyen, Frankfurt, both of (DE)

(73) Assignee: Tagor GmbH, Mainz (DE)

(*) Notice: Under 35 U.S.C. 154(b), the term of this patent shall be extended for 0 days.

(21) Appl. No.: 09/336,732

(22) Filed: Jun. 21, 1999

(30) Foreign Application Priority Data

Jun. 30, 1998 (DE) .............................................. 198 29 246

(51) Int. Cl.⁷ .............................. C08F 8/00; C08L 23/00; C08L 23/04
(52) U.S. Cl. ............................................ 525/191; 525/240
(58) Field of Search ..................................... 525/191, 240

(56) References Cited

U.S. PATENT DOCUMENTS 3,515,775   6/1970   Combs et al. .

FOREIGN PATENT DOCUMENTS

| | | |
|---|---|---|
| 4019053 | 12/1991 | (DE) . |
| 463406 | 1/1992 | (EP) . |
| 573862 | 12/1993 | (EP) . |
| 600246 | 6/1994 | (EP) . |
| 602512 | 6/1994 | (EP) . |

OTHER PUBLICATIONS

*Pat. Abst. of Japan*, vol. 13, No. 190 (C–593), May 8, 1989 (JP 01016848, Jan. 20, 1989).

Primary Examiner—Nathan M. Nutter
(74) Attorney, Agent, or Firm—Keil & Weinkauf

(57) ABSTRACT a) from 50 to 85% by weight of a copolymer of propylene (A) with 1-alkenes comprising from 20 to 80% by weight of a high molecular weight copolymer of propylene (I) containing from 2.0 to 7.0% by weight of copolymerized 1-alkene and having a viscosity of from 500 to 1200 ml/g and from 20 to 80% by weight of a low molecular weight copolymer of propylene (II) containing from 4.0 to 10.0% by weight of copolymerized 1-alkene and having a viscosity of from 200 to 450 ml/g, b) from 5 to 10% by weight of a polymer of ethylene (B) and c) from 10 to 40% by weight of a rubber-like copolymer of propylene and a 1-alkene (C) containing from 30 to 70% by weight of copolymerized 1-alkene have a melt flow index (MFI) at 230° C. under a weight of 5 kg of from 0.1 to 5 g/10 min, a molecular weight distribution ($M_w/M_n$) of from 6 to 20 and a total 1-alkene content of from 4 to 15% by weight.

12 Claims, No Drawings

POLYMER BLENDS

TITLE OF THE INVENTION

BACKGROUND OF THE INVENTION

1. Field of the Invention

The present invention relates to polymer blends comprising a) from 50 to 85% by weight of a copolymer of propylene (A) with 1-alkenes comprising from 20 to 80% by weight of a high molecular weight copolymer of propylene (I) containing from 2.0 to 7.0% by weight of copolymerized 1-alkene and having a viscosity of from 500 to 1200 ml/g and from 20 to 80% by weight of a low molecular weight copolymer of propylene (II) containing from 4.0 to 10.0% by weight of copolymerized 1-alkene and having a viscosity of from 200 to 450 ml/g, b) from 5 to 10% by weight of a polymer of ethylene (B) and c) from 10 to 40% by weight of a rubber-like copolymer of propylene and a 1-alkene (C) containing from 30 to 70% by weight of copolymerized 1-alkene, and having a melt flow index (MFI) at 230° C. under a weight of 5 kg of from 0.1 to 5 g/10 min, a molecular weight distribution ($M_w/M_n$) of from 6 to 20 and a total 1-alkene content of from 4 to 15% by weight.

The present invention further relates to a process for preparing such polymer blends, also moldings, hollow bodies and stamping plates comprising the polymer blends of the present invention and also a process for producing die stamping plates.

2. Description of the Related Art

Thermoplastic polymers, for example propylene polymers, can generally be readily processed to produce moldings or hollow bodies. In the production of die stamping plates, however, there are sometimes difficulties resulting from, inter alia, the fact that the stamping plates frequently become brittle after prolonged use.

DE-A 4019053 discloses homopolymers of propylene having a broad molecular weight distribution ($M_w/M_n$) which are suitable, in particular, for producing films and moldings. However, die stamping plates produced therefrom have a certain brittleness and a relatively rough surface, which restricts their practical use.

Furthermore, EP-A 573862 describes crystalline polymers of propylene which likewise have a broad molecular weight distribution ($M_w/M_n$). These polymers are prepared by gas-phase polymerization in the presence of Ziegler-Natta catalysts. However, the propylene polymers obtained in this way have a relatively unsatisfactory brittleness during further processing and are not completely homogeneous. The production of die stamping plates from such propylene polymers by means of a customary platen pressing process is virtually impossible since the viscosity of the melt obtained is not sufficient.

BRIEF SUMMARY OF THE INVENTION

It is an object of the present invention to remedy the disadvantages indicated and to find an improved molding composition which can be converted using customary manufacturing tools into fracture-resistant moldings and hollow bodies which have a smooth surface, a high toughness and good stiffness together with a high durability on prolonged use. Furthermore, the present object also extends to a simple and economical process for producing such moldings, and also to moldings, hollow bodies and die stamping plates comprising the molding compositions of the present invention.

The polymer blends of the present invention comprise a) from 50 to 85% by weight of a copolymer of propylene (A) with 1-alkenes comprising from 20 to 80% by weight of a high molecular weight copolymer of propylene (I) containing from 2.0 to 7.0% by weight of copolymerized 1-alkene and having a viscosity of from 500 to 1200 ml/g and from 20 to 80% by weight of a low molecular weight copolymer of propylene (II) containing from 4.0 to 10.0% by weight of copolymerized 1-alkene and having a viscosity of from 200 to 450 ml/g, b) from 5 to 10% by weight of a polymer of ethylene (B) and c) from 10 to 40% by weight of a rubber-like copolymer of propylene and a 1-alkene (C) containing from 30 to 70% by weight of copolymerized 1-alkene, and have a melt flow index (MFI) at 230° C. under a weight of 5 kg of from 0.1 to 5 g/10 min, a molecular weight distribution ($M_w/M_n$) of from 6 to 20 and a total 1-alkene content of from 4 to 15% by weight.

DETAILED DESCRIPTION OF THE INVENTION

The polymer blends of the present invention preferably consist of a) from 50 to 85% by weight, in particular from 60 to 85% by weight, of the copolymer (A), b) from 5 to 10% by weight, in particular from 5 to 7% by weight, of the polymer of ethylene (B) and c) from 10 to 40% by weight, in particular from 10 to 35% by weight, of the rubber-like copolymer of propylene and a 1-alkene (C), where the sum of the three polymers (A), (B) and (C) is always 100% by weight.

The melt flow index (MFI) of the polymer blends of the present invention at 230° C. under a weight of 5 kg, in accordance with DIN 53735, is preferably from 0.3 to 3.0 g/10 min. The polymer blends of the present invention also preferably have a molecular weight distribution ($M_w/M_n$) of from 6 to 15 and a total 1-alkene content of from 5 to 12% by weight.

For the purposes of the present invention, 1-alkenes include ethylene and, in particular, $C_4$–$C_{12}$-alk-1-enes such as 1-butene, 1-pentene, 1-hexene, 1-heptene and 1-octene, with preference being given to using ethylene and 1-butene. It is also possible to use mixtures of two different 1-alkenes, for example ethylene and 1-butene.

One constituent of the polymer blends of the present invention is the copolymer of propylene (A) with 1-alkenes, which preferably comprises from 45 to 75% by weight, in particular from 48 to 65% by weight, of a high molecular weight copolymer of propylene (I) and from 25 to 55% by weight, in particular from 35 to 52% by weight, of a low molecular weight copolymer of propylene (II). The high molecular weight copolymer of propylene (I) preferably contains from 2.0 to 7.0% by weight, in particular from 3.0 to 5.0% by weight, of copolymerized 1-alkene and preferably has a viscosity (viscosity number) of from 400 to 1200 ml/g, in particular from 450 to 700 ml/g, in each case determined at 135° C. in decalin. The low molecular weight copolymer of propylene (II) preferably contains from 4.0 to 10.0% by weight, in particular from 4.5 to 8.0% by weight, of copolymerized 1-alkene and preferably has a viscosity (viscosity number) of from 200 to 450 ml/g, in particular from 220 to 400 ml/g, in each case determined at 135° C. in decalin. As 1-alkene, preference is giving to using ethylene, if desired together with 1-butene. In particular, use is made of a copolymer of propylene (A) in which the low molecular weight copolymer of propylene (II) has a higher ethylene content than the high molecular weight copolymer of propylene (I).

The process leading to these copolymers (A) can be carried out in the customary reactors used for the polymerization of 1-alkenes, either batchwise or preferably continuously, for example in solution, as a suspension polymerization or as a gas-phase polymerization. Suitable stirred reactors are, for example, continuous stirred reactors, loop reactors or fluidized-bed reactors. Of course, the reaction can also be carried out in a plurality of reactors connected in series. The polymerization is preferably carried out in the gas phase or in suspension (bulk polymerization). Suitable gas-phase reactors are fluidized-bed reactors and horizontal or vertical stirred powder bed reactors. Particular preference is giving to using powder bed reactors in which the reaction bed is kept in motion by vertical stirrers. The reaction bed generally comprises the polymer which is produced in the respective reactor. Suitable suspension reactors are, inter alia, loop reactors.

The polymerization of the copolymers of propylene to be used according to the present invention is preferably carried out at from 30 to 150° C. and pressures in the range from 10 to 100 bar in the presence of a Ziegler-Natta catalyst system comprising
a) a titanium-containing solid component comprising at least one halogen-containing magnesium compound and an electron donor,
b) an aluminum compound and
c) a further electron donor compound.

A preferred titanium-containing solid component is, for example, prepared from titanium tetrachloride, diisobutyl phthalate, ethanol and magnesium dichloride. Its composition and preparation is known, for example, from EP-A 45975, EP-A 45977 or EP-A 86473.

To prepare other, likewise preferred titanium-containing solid components a), the titanium compounds used are, in general, the halides or alkoxides of trivalent or tetravalent titanium, including titanium-alkoxy-halide compounds or mixtures of various titanium compounds. Examples of suitable titanium compounds are $TiBr_3$, $TiBr_4$, $TiCl_3$, $TiCl_4$, $Ti(OCH_3)Cl_3$, $Ti(OC_2H_5)Cl_3$, $Ti(O-iso-C_3H_7)Cl_3$, $Ti(O-n-C_4H_9)Cl_3$, $Ti(OC_2H_5)Br_3$, $Ti(O-n-C_4H_9)Br_3$, $Ti(OCH_3)_2Cl_2$, $Ti(OC_2H_5)_2Cl_2$, $Ti(O-n-C_4H_9)_2Cl_2$, $Ti(OC_2H_5)_2Br_2$, $Ti(OCH_3)_3Cl$, $Ti(OC_2H_5)_3Cl$, $Ti(O-n-C_4H_9)_3Cl$, $Ti(OC_2H_5)_3Br$, $Ti(OCH_3)_4$, $Ti(OC_2H_5)_4$ or $Ti(O-n-C_4H_9)_4$. Preference is given to using those titanium compounds in which the halogen present is chlorine. Likewise preferred are the titanium halides which contain only titanium and halogen, especially the titanium chlorides and in particular titanium tetrachloride.

The titanium-containing solid component a) further comprises one or more halogen-containing magnesium compounds. In the context of these compounds, halogens are chlorine, bromine, iodine or fluorine or mixtures of two or more halogens, with preference being given to chlorine or bromine and in particular chlorine.

The halogen-containing magnesium compounds are either introduced directly in the preparation of the titanium-containing solid component a) or are formed during its preparation. Magnesium compounds which are suitable for preparing the titanium-containing solid component a) are, in particular, the magnesium halides, especially the chlorides or bromides, or magnesium compounds from which the halides can be obtained in a customary manner such as by reaction with halogenating agents, for example magnesium alkyls, magnesium aryls, magnesium-alkoxy or magnesium-aryloxy compounds or Grignard compounds. Suitable halogenating agents are, for example, halogens, hydrogen halides, $SiCl_4$ or $CCl_4$ and preferably chlorine or hydrogen chloride.

Examples of halogen-free compounds of magnesium which are suitable for preparing the titanium-containing solid component a) are diethylmagnesium, di-n-propylmagnesium, di-iso-propylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propoxymagnesium, di-iso-propoxymagnesium, di-n-butoxymagnesium, di-sec-butoxymagnesium, di-tert-butoxymagnesium, diamyloxymagnesium, n-butoxyethoxymagnesium, n-butoxy-sec-butoxymagnesium, n-butoxyoctyloxymagnesium or diphenoxymagnesium. Among these, particular preference is given to n-butylethylmagnesium or n-butyloctylmagnesium Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

Apart from magnesium dichloride or magnesium dibromide, particular preference is given to using the di($C_1$–$C_{10}$-alkyl)magnesium compounds for preparing the titanium-containing solid component a).

In addition, the titanium-containing solid component a) further comprises electron donor compounds, for example monofunctional or polyfunctional carboxylic acids, carboxylic anhydrides or carboxylic esters, also ketones, ethers, alcohols, lactones or organophosphorus or organosilicon compounds.

As electron donor compounds in the titanium-containing solid component, preference is given to using carboxylic acid derivatives and, in particular, phthalic acid derivatives of the formula (II)

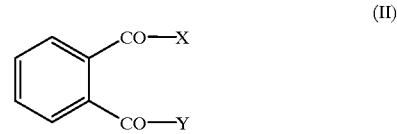

(II)

where X and Y are each a chlorine or bromine atom or a $C_1$–$C_{10}$-alkoxy radical or together represent oxygen in an anhydride function. Particularly preferred electron donor compounds are phthalic esters where X and Y are each a $C_1$–$C_8$-alkoxy radical, for example a methoxy, ethoxy, n-propoxy, iso-propoxy, n-butoxy, sec-butoxy, iso-butoxy or tert-butoxy radical. Examples of preferred phthalic esters are diethyl phthalate, di-n-butyl phthalate, di-iso-butyl phthalate, di-n-pentyl phthalate, di-n-hexyl phthalate, di-n-heptyl phthalate, di-n-octyl phthalate and di-2-ethylhexyl phthalate.

Further preferred electron donor compounds in the titanium-containing solid component are diesters of 3- or 4-membered, substituted or unsubstituted cycloalkyl-1,2-dicarboxylic acids and also monoesters of substituted benzophenone-2-carboxylic acids or substituted benzophenone-2-carboxylic acids. Hydroxy compounds used for forming these esters are the alkanols customary for esterification reactions, for example $C_1$–$C_{15}$-alkanols or $C_5$–$C_7$-cycloalkanols which may in turn bear one or more $C_1$–$C_{10}$-alkyl groups, also $C_6$–$C_{10}$-phenols.

It is also possible to use mixtures of various electron donor compounds.

In the preparation of the titanium-containing solid component a), use is generally made of from 0.05 to 2.0 mol, preferably from 0.2 to 1.0 mol, of the electron donor compounds per mol of magnesium compound.

Furthermore, in a particularly preferred embodiment, the titanium-containing solid component a) can further comprise at least one inorganic oxide as support. The support used is generally a finely divided inorganic oxide which has a mean particle diameter of from 5 to 200 $\mu$m, preferably from 20 to 70 $\mu$m. For the purposes of the present invention, the mean particle diameter is the volume-based median of the particle size distribution determined by Coulter counter analysis in accordance with ASTM Standard D 4438.

The particles of the finely divided inorganic oxide are preferably composed of primary particles which have a mean particle diameter (of the primary particles) of from 1 to 20 $\mu$m, in particular from 3 to 10 $\mu$m. The primary particles are porous, granular oxide particles which are generally obtained from a hydrogel of the inorganic oxide by milling. It is also possible to sieve the primary particles before they are further processed.

Furthermore, the inorganic oxide which is preferably used also has voids or channels having a mean diameter of from 0.1 to 20 $\mu$m, in particular from 1 to 15 $\mu$m, and a macroscopic proportion by volume in the total particle in the range from 5 to 30%, in particular in the range from 10 to 30%.

The mean particle diameter of the primary particles, the mean diameter of the voids or channels and also the macroscopic proportion by volume of the voids and channels of the inorganic oxide are advantageously determined by image analysis using scanning electron microscopy or electron probe microanalysis, in each case on particle surfaces and on particle cross sections of the inorganic oxide. The electron micrographs obtained are evaluated and the mean particle diameter of the primary particles and the macroscopic proportion by volume of the voids and channels are determined therefrom. Image analysis is preferably carried out by transforming the electron-microscopic data into a halftone binary image and digital evaluation by means of a suitable EDP program.

The inorganic oxide which is preferably used can be obtained, for example, by spray drying the milled hydrogel which is for this purpose mixed with water or an aliphatic alcohol. Such finely divided in organic oxides are also commercially available.

In addition, the finely divided inorganic oxide usually has a pore volume of from 0.1 to 10 cm$^3$/g, preferably from 1.0 to 4.0 cm$^3$/g, and a specific surface area of from 10 to 1000 m$^2$/g, preferably from 100 to 500 m$^2$/g, as determined by mercury porosimetry in accordance with DIN 66133 and by nitrogen adsorption in accordance with DIN 66131.

Suitable inorganic oxides are, in particular, the oxides of silicon, aluminum, titanium or one of the metals of main groups I and II of the Periodic Table. Preferred oxides are, for example, aluminum oxide, magnesium oxide and sheet silicates. Particular preference is given to using silicon oxide (silica gel). It is also possible to use mixed oxides such as aluminum silicates or magnesium silicates.

The inorganic oxides used as support have water present on their surface. Part of this water is bound physically by adsorption and part of it is bound chemically in the form of hydroxyl groups. The water content of the inorganic oxide can be reduced or completely eliminated by thermal or chemical treatment. A chemical treatment is generally carried out using customary desiccants such as $SiCl_4$, chlorosilanes or aluminum alkyls. The water content of suitable inorganic oxides is in the range from 0 to 6% by weight. The water content is usually determined by drying the inorganic oxide to constant weight at 160° C. under atmospheric pressure. The weight loss corresponds to the original water content. Preference is given to using an inorganic oxide in its commercially available form without further treatment.

If an inorganic oxide is used, the inorganic oxide and the magnesium compound are preferably present in the titanium-containing solid component a) in such amounts that from 0.1 to 1.0 mol, in particular from 0.2 to 0.5 mol, of the magnesium compound is present per mol of the inorganic oxide.

Furthermore, the preparation of the titanium-containing solid component a) is generally carried out using $C_1$–$C_8$-alkanols such as methanol, ethanol, n-propanol, isopropanol, n-butanol, sec-butanol, tert-butanol, isobutanol, n-hexanol, n-heptanol, n-octanol or 2-ethylhexanol or a mixture thereof. Preference is given to using ethanol.

The titanium-containing solid component can be prepared by methods known per se. Examples of methods are described, for example, in EP-A 45 975, EP-A 45 977, EP-A 86 473, EP-A 171 200, GB-A 2 111 066, U.S. Pat. Nos. 4,857,613 and 5,288,824.

In the preparation of the titanium-containing solid component a), the following two-stage process is preferably employed:

In the first stage, the inorganic oxide is placed in an inert solvent, preferably a liquid alkane or an aromatic hydrocarbon, e.g. toluene or ethylbenzene, and first admixed with a solution of the magnesium-containing compound, after which this mixture is generally left to react while stirring for from 0.5 to 5 hours at from 10 to 120° C. Subsequently, usually while stirring continually, a halogenating agent is added thereto in an at least two-fold, preferably at least five-fold, molar excess, based on the magnesium-containing compound, and the mixture is allowed to react for from about 30 to 120 minutes. The $C_1$–$C_8$-alkanol and also the titanium compound and the electron donor compound are then added thereto at from –20 to 150° C. The titanium compound and the electron donor compound can be added simultaneously with the $C_1$–$C_8$-alkanol, but the $C_1$–$C_8$-alkanol can also be first allowed to act on the intermediate for from about 10 to 120 minutes at from 0 to 100° C. From 1 to 5 mol, preferably from 1.6 to 4 mol, of the $C_1$–$C_8$-alkanol, from 1 to 15 mol, preferably from 2 to 10 mol, of the titanium compound and from 0.01 to 1 mol, preferably from 0.3 to 0.7 mol, of the electron donor compound are used per mol of magnesium. This mixture is allowed to react, generally while stirring, for at least 10 minutes, in particular at least 30 minutes, at from 10 to 150° C., preferably from 60 to 130° C. The solid obtained in this way is subsequently filtered off and washed with a $C_7$–$C_{10}$-alkylbenzene, preferably with ethylbenzene.

In the second stage, the solid obtained in the first stage is extracted at from 100 to 150° C. with excess titanium tetrachloride or an excess of a solution of titanium tetrachloride in an inert solvent, preferably a $C_7$–$C_{10}$-alkylbenzene, with the solvent containing at least 5% by weight of titanium tetrachloride. The extraction is generally carried out for at least 30 minutes. The product is then washed with a liquid alkane until the titanium tetrachloride content of the washings is less than 2% by weight.

Suitable aluminum compounds b) are trialkylaluminum and also compounds in which one alkyl group is replaced by an alkoxy group or by a halogen atom, for example by chlorine or bromine. The alkyl groups can be identical or different. Linear or branched alkyl groups are possible. Preference is given to using trialkylaluminum compounds whose alkyl groups each have from 1 to 8 carbon atoms, for example trimethylaluminum, triethylaluminum, tri-iso-butylaluminum, trioctylaluminum or methyldiethylaluminum or mixtures thereof.

Apart from the aluminum compound b), use is made of electron donor compounds c) such as monofunctional or polyfunctional carboxylic acids, carboxylic anhydrides or carboxylic esters, or ketones, ethers, alcohols, lactones or organophosphorus and organosilicon compounds as further cocatalysts. These electron donor compounds c) can be identical to or different from the electron donor compounds used for preparing the titanium-containing solid component a). Preferred electron donor compounds here are organosilicon compounds of the formula (I)

$$R^1{}_n Si(OR^2)_{4-n} \qquad (I)$$

where $R^1$ are identical or different and are each a $C_1$–$C_{20}$-alkyl group, a 5- to 7-membered cycloalkyl group which may in turn bear $C_1$–$C_{10}$-alkyl groups as substituents, a $C_6$–$C_{18}$-aryl group or a $C_6$–$C_{18}$-aryl-$C_1C_{10}$-alkyl group, $R^2$ are identical or different and are each a $C_1$–$C_{20}$-alkyl group and n is one of the integers 1, 2 and 3. Particular preference is given to compounds in which $R^1$ is a $C_1$–$C_8$-alkyl group or a 5- to 7-membered cycloalkyl group and $R^2$ is a $C_1$–$C_4$-alkyl group and n is 1 or 2.

Among these compounds, particular mention may be made of diisopropyldimethoxysilane, isobutylisopropyldimethoxysilane, diisobutyldimethoxysilane, dicyclopentyldimethoxysilane, dicyclohexyldimethoxysilane, cyclohexylmethyldimethoxysilane, isopropyl-tert-butyldimethoxysilane, isobutyl-sec-butyldimethoxysilane and isopropyl-sec-butyldimethoxysilane. Very particular preference is given to dicyclopentyldimethoxysilane.

The compounds b) and c) which act as cocatalysts can be allowed to act either individually, in succession in any order or simultaneously on the titanium-containing solid component a). This is usually carried out at from 0 to 150° C., in particular from 20 to 90° C., and pressures of from 1 to 100 bar, in particular from 1 to 40 bar.

The cocatalyst b) is preferably used in such an amount that the atomic ratio of aluminum from the aluminum compound b) to titanium from the titanium-containing solid component a) is from 10:1 to 800:1, in particular from 20:1 to 200:1. However, the cocatalyst b) can also be used in such an amount that this ratio of aluminum to titanium is outside the abovementioned range.

The molar ratio of the aluminum compound b) to the further electron donor compound c) is, in the preferred process, in the range from 300:1 to 1:1, in particular in the range from 200:1 to 2:1 and particularly preferably in the range from 150:1 to 2.5:1.

The molar mass of the copolymers of propylene (A) can be controlled and set over a wide range by addition of regulators customary in polymerization technology, for example hydrogen. It is also possible to use inert solvents such as toluene or hexane, inert gas such as nitrogen or argon and relatively small amounts of polypropylene powder.

The copolymer of propylene (A) usually has a molecular weight (weight average) of from 100,000 to 1,000,000 g/mol, in particular from 150,000 to 700,000 g/mol. Its melt flow index (MFI) at 230° C. under a weight of 5.0 kg, in accordance with DIN 53735, is in the range from 0.1 to 5.0 g/10 min, in particular in the range from 0.3 to 3.0 g/10 min, its viscosity measured in decalin at 135° C. is in the range from 350 to 650 ml/g, in particular in the range from 400 to 600 ml/g, and its content of copolymerized 1-alkene is from 2.5 to 8.5% by weight, in particular from 3.0 to 7.5% by weight.

The copolymers of propylene (A) are preferably prepared by a two-stage process in which a) in a first polymerization step at from 30 to 150° C., a pressure of from 10 to 100 bar and an average residence time of from 0.5 to 6 hours in the presence of a Ziegler-Natta catalyst system comprising a titanium-containing solid component, an aluminum component and, if desired, a further electron donor compound, propylene and 1-alkene are polymerized with one another to give the high molecular weight copolymer of propylene (I) and then b) in a second polymerization step at from 30 to 150° C., a pressure of from 10 to 100 bar and an average residence time of from 0.5 to 6 hours in the presence of the Ziegler-Natta catalyst system used in the first polymerization step, propylene and further i-alkene are polymerized onto the copolymer of propylene (I) from the first polymerization step, forming the low molecular weight copolymer of propylene (II), so that the high molecular weight copolymer of propylene (I) and the low molecular weight copolymer of propylene (II) together give the copolymer of propylene (A).

In both polymerization steps, the polymerization is preferably carried out in a suspension by the bulk process, where the monomers, i.e. propylene and the 1-alkene different from propylene, are both starting materials and suspension medium.

Furthermore, the process for preparing the copolymers of propylene (A) can also be carried out with insertion of a prepolymerization either in front of the first polymerization step, in front of the second polymerization step or in front each of the two polymerization steps. The first and second polymerization stages and also the prepolymerization can each be carried out batchwise or continuously, with the latter being preferred.

The prepolymerization is preferably carried out by first mixing the aluminum compound b) and the further electron donor compound c) with one another and then bringing this mixture into contact with the titanium-containing solid component a). Propylene is then prepolymerized in suspension or in a bulk process in the presence of such an activated component. The prepolymerization is preferably carried out in liquid monomers at average residence times of from 4 to 10 minutes, in particular from 4.5 to 9.0 minutes, pressures of from 1 to 50 bar, in particular from 1.5 to 40 bar, and temperatures of from 10 to 25° C., in particular from 12 to 23° C. The prepolymer is then introduced into the respective polymerization stage.

In the first polymerization step, polymerization is preferably carried out in liquid propylene at from 55 to 100° C., a pressure of from 10 to 100 bar and an average residence time of from 0.5 to 3.5 hours, with the 1-alkene being metered in continuously until a 1-alkene concentration of from 0.1 to 20% by weight, preferably from 0.1 to 10% by weight, is established in the liquid phase. It has been found to be advantageous to employ a phase ratio in the range from 2.5 to 4 liters of liquid propylene, preferably from 2.8 to 3.5 liters of liquid propylene, per kg of copolymer of propylene (I) prepared.

After the first polymerization step, the multiphase system is transferred to the second polymerization step in which a mixture of liquid propylene and one or more 1-alkenes is polymerized, preferably at from 55 to 100° C., a pressure of from 10 to 100 bar and a mean residence time of from 0.5 to 6 hours. The 1-alkene is metered in until a 1-alkene concentration of from 0.01 to 30% by weight, in particular from 0.1 to 20% by weight, is established in the liquid phase. A phase ratio of from 1 to 2.5 liters of liquid propylene per kg of copolymer of propylene (II), in particular from 1.3 to 2.2 liters of liquid propylene per kg of copolymer of propylene (II), should be set. It has been found to be advantageous to select different phase ratios and temperatures in the two polymerization steps. The hydrogen preferably used as regulator can also be present in different concentrations in the two polymerization stages.

After the second reaction step, the mixture of propylene, hydrogen and 1-alkene is worked up. Preference is given to rapid evaporation of the liquid monomer in one step. The copolymer is subsquently freed of monomers by treatment with steam and is dried in a stream of inert gas. The vaporized monomer mixture can be condensed, separated, purified and then returned to the reactor.

The copolymers of propylene (A) which are used according to the present invention can further comprise additives such as stabilizers, lubricants and mold relese agents, fillers, nucleating agents, antistatics, plasticizers, dyes, pigments or flame retardants, which are added in customary amounts before use. In general, they are incorporated into the copolymer during the granulation of the pulverulent polymerization product.

Customary stabilizers are antioxidants such as sterically hindered phenols, processing stabilizers such as phosphites or phosphonites, acid traps such as calcium stearate or zinc stearate or dihydrotalcite, sterically hindered amines or UV stabilizers. In general, the copolymers of propylene (A) used according to the present invention contain one or more stabilizers in a mounts of up to 2% by weight.

Suitable lubricants and mold release agents are, for example, fatty acids, calcium or zinc salts of fatty acids, fatty acid amides or low molecular weight polyolefin waxes which are usually used in concentrations of up to 2% by weight.

Suitable fillers for the copolymers of propylene (A) are, for example, talc, chalk or glass fibers, which can be used in amounts of up to 50% by weight.

Suitable nucleating agents are, for example, inorganic additives such as talc, silica or kaolin, salts of monocarboxylic or polycarboxylic acids such as sodium benzoate or aluminum tert-butyl benzoate, dibenzylidenesorbitol or its $C_1$–$C_8$-alkyl-substituted derivatives such as methyl- or dimethyldibenzylidenesorbitol or salts of diesters of phosphoric acid, e.g. sodium 2,2'-methylenebis (4,6-di-tert-butylphenyl)phosphate. The amount of nucleating agents present in the random propylene copolymers is generally up to 5% by weight.

Such additives are generally commercially available and are described, for example, in Gächter/Müller, Plastics Additives Handbook, 4th Edition, Hansa Publishers, Munich, 1993.

After the preparation of the copolymers of propylene (A) in the two polymerization steps a) and b) and, if desired, after an appropriate work-up of the copolymer (A) and addition of additives, the preparation of the polymer blends of the present invention is preferably continued in a third step c) by mixing the polymer of ethylene (B) and the rubber-like copolymer (C) into the copolymer (A) in a customary mixing apparatus at from 180 to 300° C., in particular from 190 to 290° C. and average residence times of from 0.1 to 5.0 minutes, in particular from 0.2 to 4.0 minutes. Mixing apparatuses which can be used here are, in particular, extruders or kneaders, with twin-screw extruders being particularly preferred.

The process for preparing the polymer blends, which is likewise subject matter of the present invention, thus comprises the two polymerization steps a) and b) and the subsequent mixing of the copolymer of propylene (A) obtained from a) and b) with the polymer of ethylene (B) and the rubber-like copolymer (C) in step c).

Suitable polymers of ethylene (B) include both ethylene homopolymers (HDPE) having a density of from 0.900 to 0.950 $g/cm^3$, in particular from 0.905 to 0.945 $g/cm^3$, and, for example, copolymers of ethylene containing minor proportions of 1-butene. Such polymers of ethylene (B) are obtainable, for example, by polymerization of ethylene in the gas phase or in a suspension polymerization using customary Ziegler catalysts or Phillips catalysts. The polymers of ethylene (B) can also be obtained with the aid of metallocene catalysts. They can further comprise up to 4.0% by weight, in particular up to 2.0% by weight, of copolymerized $C_3$–$C_{12}$-alk-1-enes, for example propylene, 1-butene or 1-hexene. They can be obtained, inter alia, as commercial plastics products and may also contain the same additives as described above for the copolymer of propylene (A).

As rubber-like copolymer of propylene and a 1-alkene (C) containing from 30 to 70% by weight, in particular from 35 to 65% by weight, of copolymerized 1-alkene, use is made, inter alia, of the following copolymers: copolymers of propylene with minor proportions of ethylene or 1-butene or terpolymers of propylene with minor proportions of ethylene and 1-butene or copolymers of propylene with cycloolefins. Here, the term 1-alkenes refers to the same unsaturated comonomers as have been described above in the discussion of the copolymer of propylene (A). Such rubber-like copolymers of propylene and a 1-alkene are usually prepared by gas-phase polymerization or suspension polymerization using Ziegler-Natta catalysts or Phillips catalysts or metallocene catalysts. Such rubber-like copolymers (C) can also be obtained as commercial plastics products. The rubber-like copolymers (C) can have added to them comparable amounts of the same additives as have been described in the discussion of the copolymer of propylene (A).

In the mixing apparatus, the polymer of ethylene (B) and the rubber-like copolymer (C) can be added to the copolymer of propylene (A) either separately or together in the form of a masterbatch.

The polymer blends of the present invention comprising the copolymer of propylene (A) with 1-alkenes, the polymer of ethylene (B) and the rubber-like copolymer (C) are suitable, in particular, for producing hollow bodies and moldings such as die stamping plates, pipes or fittings. Particularly favorable properties are displayed by die stamping plates made of the polymer blends of the present invention.

Such die stamping plates are preferably produced by a process which is likewise the subject matter of the present invention and comprises producing a die stamping plate from a granulated polymer blend of (A), (B) and (c) in a platen press at from 180 to 300° C., a pressure of from 1 to 500 bar and a pressing time of from 0.1 to 120 minutes.

The polymer blends of the present invention are particularly suitable for producing hollow bodies and moldings, for example die stamping plates, which are notable for, inter alia, high fracture strength and toughness, good stiffness and durability on prolonged use together with a smooth surface. The processes of the present invention for preparing copolymers of propylene (A) and producing die stamping plates can be carried out economically without a great outlay.

EXAMPLES

Example 1
Preparation of the copolymer of propylene (A)

The polymerization is carried out continuously in two stirred vessels connected in series, each having a capacity of 16 l. Each reactor is charged with 10 l of liquid propylene. The catalyst component b) used is triethylaluminum in a concentration of 1 mmol/l; the concentration of the catalyst component c) is 0.1 mmol/l. The component c) used is cyclohexylmethyldimethoxysilane. The hydrogen concentration in the liquid phase of the first reactor is set to 120 ppm by volume.

In the first reactor, a mixture of propylene and ethylene is polymerized in the presence of a titanium-containing solid component as catalyst component a) comprising titanium tetrachloride, diisobutyl phthalate, magnesium dichloride and ethanol (catalyst Montell® FT 4S from Montell) at 70° C., a pressure of 32 bar and an average residence time of 1.2 hours. Further amounts of catalyst, cocatalyst, ethylene, propylene and hydrogen are metered in continuously. 15 g of ethylene are metered in per kg of propylene. Polymerization is carried out at a solids content of 224 g of copolymer per liter of suspension (propylene). This gives a phase ratio of 3.3 l of liquid propylene per kg of polypropylene (PP). Further amounts of hydrogen ($H_2$) are metered in so that a concentration of 120 ppm by volume is established in the liquid phase. The high molecular weight copolymer of propylene (I) obtained has a viscosity of 680 ml/g and an ethylene content of 3.2% by weight.

The copolymer of propylene (I) obtained in the first reactor is transferred together with the catalyst into the second reactor. In the second reactor, further amounts of ethylene, hydrogen and propylene are metered in. 35 g of ethylene are metered in per kg of propylene. The $H_2$ concentration in the liquid phase is 1600 ppm by volume. The reactor temperature in the second reactor is likewise 70° C., the pressure is 35 bar and the average residence time is 0.8 hours. 324 g of copolymer of propylene (II) are obtained per liter of the suspension comprising propylene. This gives a phase ratio of 1.9 l of liquid propylene per kg of copolymer. The low molecular weight copolymer of propylene (II) obtained in the second reactor has a viscosity of 260 ml/g and an ethylene content of 5.5% by weight.

After the copolymer (A) had been isolated as powder from the second reactor, a catalyst yield of 33 kg of copolymer A/g of catalyst was calculated. A molecular weight distribution ($M_w/M_n$) of 9.5, an MFI of 1.4 g/10 min and a viscosity number of 487 ml/g were measured. The ethylene incorporation measured by means of IR spectroscopy was 4.2% by weight. The proportion of xylene-soluble material was measured as 9.5% by weight. The copolymer (A) comprised about 58.0% by weight of the high molecular weight copolymer (I) and about 42.0% by weight of the low molecular weight copolymer (II).

| Test methods: | |
|---|---|
| Molecular weight distribution ($M_w/M_n$) | by gel permeation chromatography |
| Melt flow index (MFI) | if accordance with DIN 53735, at 230° C. under a load of 5 kg |
| Viscosity number (ml/g) | determined in decalin at 135° C. |
| Comonomer content (% by weight) | by infrared spectroscopy (IR spectroscopy) |

Example 2
Testing of die stamping plates

Since the suitability of a PP material for die stamping plates cannot be described solely by customary test values such as hardness, modulus of elasticity, impact toughness and notched impact toughness, tests have to be carried out under conditions which are close to those encountered in practice.

The test apparatus used is a die stamping apparatus provided with a circular cutter. The die stamping plate to be tested is produced as a compression-molded plate (diameter: 150 mm, thickness: 25 mm) and installed in the die stamping apparatus. The cutter has a diameter of about 50 mm. After each stamping stroke at a pressure of 150 bar, the die stamping plate to be tested is rotated through a certain angle. The cuts made by the cutter then intersect, giving a rosette-like pattern on the die stamping plate. The diameter of each rosette is about 130 mm. Different numbers of stamping strokes can be selected.

After about 1000 stamping strokes, the suitability of the material can be assessed qualitatively compared to other specimens by examination of the stamping pattern. In addition, the plate which has been tested can be reweighed after removal of loose material which has been cut out and the proportion of material which has been cut out is determined gravimetrically.

For the qualitative evaluation, the following criteria are examined:

Penetration depth of the cutter?
Appearance of the cuts?
Detachment of particles?
Appearance of the die stamping plate in the triangular intersection regions of the intersecting stamping cuts?

Example 3
Preparation of a polymer blend according to the present invention 80 kg of the copolymer of propylene (A) obtained from Example 1 were first mixed with 0.1% by weight of Irganox® 1010 from Ciba-Geigy and 0.1% by weight of Hostanox® PAR 24 from Hoechst.

Irganox® 1010 from Ciba-Geigy is pentaerythrityl tetrakis[3-(3,5-bis(1,1-dimethylethyl)-4-hydroxyphenol) propionate] and Hostanox® PAR 24 from Hoechst is a stabilizer based on an organic phosphoric ester of thio-bisphenol.

The additive-containing copolymer of propylene (A) obtained was then admixed with 20 kg of a rubber batch (Exxelor® VM 42 from Exxon Chemicals). The rubber batch contained 66% by weight of a rubber-like copolymer (C) of propylene and 60% by weight of copolymerized ethylene and 34% by weight of an ethylene homopolymer (B) having a density of 0.94 g/cm$^3$. In addition, 0.2% by weight of a colorant mixture comprising iron(III) oxide was added. This mixture of 79.7% by weight of copolymer of propylene (A), 6.8% by weight of polymer of ethylene (B) and 13.1% by weight of rubber-like copolymer (C) as well as 0.1% by weight of Irganox, 0.1% by weight of Hostanox and 0.2% by weight of the colorant mixture was granulated at about 240° C. under inert gas in a twin-screw extruder having a screw diameter of 53 mm. The finished granulated material had a viscosity number of 451 ml/g, an ethylene content of 10.5% by weight, a melt flow index (MFI) of 2 g/10 min at 230° C. under a load of 5 kg and a molecular weight distribution ($M_w/M_n$) of 8.

Example 4
In a platen press, a compression-molded plate (diameter 150 mm, thickness 25 mm) was produced from the granulated material from Example 3 under a pressure of 90 bar and at a temperature of 220° C. and a pressing time of 90 min.

Example 5

The plate from Example 4 was installed in a stamping apparatus as described in Example 2 and 5000 stamping strokes were carried out. The compression-molded plate had the characteristic overlapping rosette pattern. The penetration depth of the cutter was determined as 1 mm at the deepest points. The cuts had smooth edges. The flanks were close together since they recovered after penetration of the cutter. It was found that no particles or fragments became detached from the plate. Particularly in the region of the overlaps of two stamping cuts, no detached fragments were detected. The plate had only a small weight loss of 0.05% by weight.

Example 6

The stamping test described in Example 5 was repeated using a new plate; the number of stamping strokes was doubled to 10,000. The weight loss was likewise only 0.06% by weight.

Example 7

The stamping test described in Example 5 was repeated using a new plate; the number of stamping strokes was increased to 35,000. The weight loss was likewise only 0.3% by weight.

Comparative Example A

Using the same Ziegler-Natta catalyst as described in Example 1, 50 l of liquid propylene were polymerized batchwise in a stirred vessel having a capacity of 70 l. A total of 354 mg of the titanium-containing solid component a), 2 mmol of triethylaluminum per liter of propylene and 0.1 mmol of cyclohexylmethyldimethoxysilane per liter of propylene were used. 2.3 standard l of hydrogen were subsquently metered in. The polymerization temperature was 70° C. and the polymerization time was 100 minutes. After the polymerization, the reactor was vented, vaporizing the liquid monomer, and the product was taken from the reactor as powder.

A catalyst yield of 18.3 kg of propylene homopolymer/g of catalyst was obtained. An MFI (230/5) of 1.4 g/10 min was measured. The proportion of material soluble in cold xylene was determined as 2.9% by weight.

The powder obtained from Comparative Example A was granulated at about 240° C. under inert gas in a twin-screw extruder having a screw diameter of 53 mm. 0.15% by weight of Irganox® 1010 from Ciba-Geigy and 0.15% by weight of Hostanox® PAR 24 from Hoechst were added as stabilizers during this procedure. In addition, the same colorant mixture as described in Example 3 was added in the same weight ratio.

A compression-molded plate was produced as described in Example 4 from the granulated material obtained in this way.

This plate was installed in a die stamping apparatus as described in Example 2 and 5000 stamping strokes were carried out. The compression-molded plate had the characteristic rosette pattern as in Example 5. The penetration depth of the cutter was determined as 0.8 mm at the deepest points. Stress whitening could be seen at the cuts. It was discovered that particles having a diameter of about 2 mm became detached from the plate. Particularly in the region of the overlaps of two stamping cuts, an increased number of fragments was detected. The plate had a weight loss of 1.5% by weight. Owing to the high weight loss, the material is not suitable for use as die stamping plate material.

Example 8

Example 1 was repeated using biscyclopentyldimethoxysilane as catalyst component c). After the polymer had been isolated as powder from the second reactor, a catalyst yield of 35.3 kg of copolymer (A)/g of catalyst was obtained. A molecular weight distribution $M_w/M_n$ of 9.8, an MFI of 1.5 g/10 min and a viscosity number of 478 ml/g were measured. An ethylene incorporation of 4.1% by weight was determined by IR spectroscopy. The proportion of material soluble in cold xylene was measured as 7.8% by weight.

The copolymer (A) obtained was first admixed, as described in Example 3, with Irganox® 1010 and Hostanox® PAR 24 and then provided with 20% by weight of the rubber batch (Exxelor® VM 42 from Exxon Chemicals).

The rubber batch contained 66% by weight of a rubber-like copolymer (C) of propylene and 60% by weight of copolymerized ethylene and 34% by weight of an ethylene homopolymer (B) having a density of 0.94 g/cm$^3$. In addition, 0.2% by weight of a colorant mixture comprising iron(III) oxide was added. This mixture of 79.7% by weight of copolymer of propylene (A), 6.8% by weight of polymer of ethylene (B) and 13.1% by weight of rubber-like copolymer (C) as well as 0.1% by weight of Irganox, 0.1% by weight of Hostanox and 0.2% by weight of the colorant mixture was mixed in a twin-screw extruder using a method similar to Example 3.

Using a method analogous to Examples 4 and 7, a compression-molded plate was produced from the granulated material and was tested in the die stamping apparatus. The weight loss was only 0.28% by weight.

Comparison of the die stamping plates obtained from the Examples 5, 6, 7 and 8 according to the present invention with the die stamping plates of Comparative Example A makes it clear that the former have a weight loss of significantly less than 1% by weight, while the weight loss of the die stamping plates of Comparative Example A is 1.5% by weight. In addition, the die stamping plates obtained from the polymer blends of the present invention have, inter alia, a smooth surface, a high stiffness and toughness together with a high durability on prolonged use.

We claim:

1. A polymer blend comprising a) from 50 to 85% by weight of a copolymer of propylene (A) with 1-alkenes comprising from 20 to 80% by weight of a high molecular weight copolymer of propylene (I) containing from 2.0 to 7.0% by weight of copolymerized 1-alkene and having a viscosity of from 500 to 1200 ml/g and from 20 to 80% by weight of a low molecular weight copolymer of propylene (II) containing from 4.0 to 10.0% by weight of copolymerized 1-alkene and having a viscosity of from 200 to 450 ml/g, b) from 5 to 10% by weight of a polymer of ethylene (B) and c) from 10 to 40% by weight of a rubber-like copolymer of propylene and a 1-alkene (C) containing from 30 to 70% by weight of copolymerized 1-alkene, and having a melt flow index (MFI) at 230° C. under a weight of 5 kg of from 0.1 to 5 g/10 min, a molecular weight distribution ($M_w/M_n$) of from 6 to 20 and a total 1-alkene content of from 4 to 15% by weight.

2. A polymer blend as defined in claim 1, wherein the copolymer of propylene (A) with a 1-alkene comprises from 45 to 75% by weight of a high molecular weight copolymer of propylene (I) containing from 2 to 7% by weight of copolymerized 1-alkene and having a viscosity of from 500 to 1200 ml/g and from 25 to 55% by weight of a low molecular weight copolymer of propylene (II) containing from 4 to 10% by weight of copolymerized 1-alkene and having a viscosity of from 200 to 450 ml/g.

3. A polymer blend as defined in claim 1, wherein the polymer (B) which is used is an ethylene homopolymer (HDPE) having a density of from 0.900 to 0.950 g/cm$^3$.

4. A polymer blend as defined in claim 1, wherein the rubber-like copolymer of propylene and a 1-alkene (C) contains from 35 to 65% by weight of copolymerized 1-alkene.

5. A polymer blend as defined in claim 1, comprising
a) from 60 to 85% by weight of the copolymer (A),
b) from 5 to 7% by weight of the polymer of ethylene (B) and
c) from 10 to 35% by weight of the rubber-like copolymer of propylene and a 1-alkene (C).

6. A polymer blend as defined in claim 1 which has a melt flow index (MFI) at 230° C. under a weight of 5 kg of from 0.1 to 5.0 g/10 min, a molecular weight distribution ($M_w/M_n$) of from 6 to 20 and a total 1-alkene content of from 4 to 15% by weight.

7. A polymer blend as defined in claim 1, wherein the 1-alkene used in copolymer (A) and in the rubber-like copolymer (C) is ethylene or a mixture of ethylene and a $C_4$–$C_{12}$-alk-1-ene.

8. A process for preparing a polymer blend comprising
a) from 50 to 85% by weight of a copolymer of propylene (A) with 1-alkenes comprising from 20 to 80% by weight of a high molecular weight copolymer of propylene (I) containing from 2.0 to 7.0% by weight of copolymerized 1-alkene and having a viscosity of from 500 to 1200 ml/g and from 20 to 80% by weight of a low molecular weight copolymer of propylene (II) containing from 4.0 to 10.0% by weight of copolymerized 1-alkene and having a viscosity of from 200 to 450 ml/g,
b) from 5 to 10% by weight of a polymer of ethylene (B) and
c) from 10 to 40% by weight of a rubber-like copolymer of propylene and a 1-alkene (C) containing from 30 to 70% by weight of copolymerized 1-alkene,
and having a melt flow index (MFI) at 230° C. under a weight of 5 ka of from 0.1 to 5 g/10 min, a molecular weight distribution ($M_w/M_n$) of from 6 to 20 and a total 1-alkene content of from 4 to 15% by weight.

9. A process as defined in claim 8, wherein the copolymerization in the two polymerization steps is carried out in suspension.

10. A molding or hollow body formed from the polymer blend defined in claim 1.

11. A stamping plate formed from the polymer blend defined in claim 1.

12. A process for producing a stamping plate which comprises forming a stamping plate from a granulated polymer blend as defined in claim 1 in a platen press at from 180 to 300° C., a pressure of from 1 to 500 bar and a pressing time of from 0.1 to 120 minutes.

* * * * *

UNITED STATES PATENT AND TRADEMARK OFFICE
CERTIFICATE OF CORRECTION

PATENT NO.: 6,191,223

DATED: February 20, 2001

INVENTOR(S): DOLLE et al.

It is certified that error appears in the above-identified patent and that said Letters Patent is hereby corrected as shown below:

In the abstract, add as the first line:

--Polymer blends comprising:--

Col. 16, claim 8, line 20, "5 ka" should be --5 kg--.

Signed and Sealed this

Twenty-ninth Day of May, 2001

Attest:

NICHOLAS P. GODICI

Attesting Officer

Acting Director of the United States Patent and Trademark Office